(12) United States Patent
Sushkov (10) Patent No.: US 12,143,450 B1
(45) Date of Patent: Nov. 12, 2024

(54) MUTUAL FACE RECOGNITION COMMUNICATION CHANNEL ESTABLISHMENT

(71) Applicant: Rusian Sushkov, Brooklyn, NY (US)

(72) Inventor: Rusian Sushkov, Brooklyn, NY (US)

(*) Notice: Subject to any disclaimer, the term of this patent is extended or adjusted under 35 U.S.C. 154(b) by 0 days.

(21) Appl. No.: 18/362,355

(22) Filed: Jul. 31, 2023

(51) Int. Cl.
*H04L 67/141* (2022.01)
*H04L 67/306* (2022.01)

(52) U.S. Cl.
CPC .......... *H04L 67/141* (2013.01); *H04L 67/306* (2013.01)

(58) Field of Classification Search
CPC ............................ H04L 67/141; H04L 67/306
See application file for complete search history.

(56) References Cited

U.S. PATENT DOCUMENTS

| | | | |
|---|---|---|---|
| 6,819,919 B1 | 11/2004 | Tanaka | |
| 7,015,817 B2 | 3/2006 | Copley et al. | |
| 7,319,397 B2 | 1/2008 | Chung et al. | |
| 9,355,548 B2 | 5/2016 | Buck, Jr. et al. | |
| 9,648,581 B1 | 5/2017 | Vaynblat et al. | |
| 9,854,616 B2 | 12/2017 | Raphael | |
| 11,508,231 B2 | 11/2022 | Kusens | |
| 2011/0238755 A1 | 9/2011 | Khan et al. | |
| 2017/0099579 A1 | 4/2017 | Ryan et al. | |
| 2018/0124564 A1 | 5/2018 | Phillips et al. | |
| 2019/0043137 A1 | 2/2019 | Mathis | |

*Primary Examiner* — Blake J Rubin
(74) *Attorney, Agent, or Firm* — Michael J. Feigin, Esq.; Feigin and Fridman LLC (57) ABSTRACT

Determinations are made to associate end-user devices to specific locations at specific times. Each device is associated with at least one photograph. When a user desires to establish a communication channel with another end-user, the first end-user device sends a query to a server, which then sends a photograph of each other end-user who was present at the queried location during at least a part of the queried time window to the first end-user. The first end-user selects a photograph of an end-user with whom the establishment of a communication channel is desired. The end-user associated with the photograph is prompted to accept or decline the proposed establishment of a communication channel. If the selected end-user accepts the request, a communication channel is established between the first end-user and the selected end-user. If the request is denied, the first end-user selects another end-user with whom to establish a communication channel.

14 Claims, 4 Drawing Sheets

MUTUAL FACE RECOGNITION COMMUNICATION CHANNEL ESTABLISHMENT

FIELD OF THE INVENTION

The present invention relates to communication systems and, more specifically, to a technology that facilitates the establishment of communication between two users based on the recognition of a second user from a profile photo.

BACKGROUND

Communication plays a vital role in connecting individuals across the globe, and technological advancements have significantly transformed the way people interact. Various methods have been developed to facilitate communication, including phone calls, emails, messaging applications, and social media platforms. These methods typically require the manual input of contact information or the need to search for and add contacts.

With the rise of online networking, users often create profiles that include their personal information and a profile photo. These profile photos serve as visual representations of individuals, allowing others to identify them and establish connections based on their appearance. However, existing communication systems do not fully leverage photos as a means to initiate communication and establish connections.

When communication establishment is executed when users recognize photos of other users, there is a need for an improved technology that sorts which photos to show to a user based on mutual prior presence at the same time in a specific location.

SUMMARY

In embodiments of the disclosed technology, a plurality of end-user devices are utilized. Each of these devices has a transceiver with a wireless data connection (or wireless data connectivity) to a packet-switched network, as well as a global positioning system receiver via network nodes. A network storage device at another or one of the above network nodes stores data corresponding to a plurality of photographs associated with specific end-users (defined as human operators of devices connected to a network) and/or specific end user devices. A network server at a separate network node or one of the above network nodes receives a query from one of the end-user devices of the plurality thereof. The query has, at least, a combination of a location and a prior time window. The query prompts the network server to send photographic data to the device from which the query was made (or a separate end-user device at a time of responding to the query, the separate end-user device being associated with a user of the first-user device from which the query was received).

The querying end-user device then displays pictures associated with other end-users (or end-user devices) who were present in the same location within a prior time window selected/searched within the query. Location history is obtained via each device's global positioning receiver. The prior time window is determined by storing a record of when each end-user device was present within a certain location. Two (or more) devices are considered to have been in the same location within the same prior time window even if their locations were only mutual for a part of the prior time window.

In some embodiments of the disclosed technology, the user of the querying first end-user device selects a photograph associated with a second end-user device (or present or past user of the end-user device), whereupon a request to open a written, oral, audio, or other form of a communication channel is sent to the second end-user device (or present end-user device associated with a second user which was at the queried location within the queried time window). A "communication channel" is defined as a media, method, device, or combination thereof which allows multiple human users to exchange information perceptible to said users. The second end-user device may receive a prompt (a request for data input exhibited to an end-user), with which the user of the second-end user device may accept or decline the request to establish the aforementioned communication channel. Should the user of the second end-user device accept the request, the device may send to the network server data indicating the acceptance. The requested communication channel is, in some embodiments, thereby established between the first end-user device and the second end-user device, thus facilitating contact between the devices' respective users.

Any end-user device, such as the first end-user device, second end-user device, or any combination of a plurality of end-users devices used in embodiments of the disclosed technology may be changeably selectable between a plurality of devices authenticated as being used by a respective end-user. For example, the second end-user device may be changeably selectable between a plurality of devices authenticated as being used by a second end-user and so forth. This functionality impacts the determination process of the prior time window and the location of the first end-user, where, in some embodiments, the aforementioned determination is associated to a first of the plurality of devices that can be changeably selected by the first end-user.

When the query of the first end-user originates from a second (or other) device of the plurality of devices, the determination of the prior time window and location used in the query is executed by the first of the plurality of the devices. The query results are limited to second end-user devices that were present at the location of the querying first end-user device during at least part of the prior time window. Furthermore, the second end-user may receive the request to establish a communication channel on one of the plurality of devices authenticated to be of the second end-user that is currently associated with (authenticated as being operated by) a user who was determined to have been using a different device of the plurality of devices at the queried location and within the prior time window.

A method of matching people, such as using the system described above, proceeds as follows in some embodiments of the disclosed technology. A server, via a packet-switched network, sends and receives communication between multiple end-user devices in order to match (correlate multiple end-users and/or end-user devices based upon a chosen characteristic (e.g. location) mutual) users of at least two end-user devices by providing photographs associated with one end-user device to another end-user device, limited to photographs where the end-user devices (or a changeably selected end-user devices) were at a same location within a queried (searched) prior time window or a part thereof. The server can be a plurality thereof acting together. The photographs are received from end-user devices and associated with particular users thereof. "Associate" is defined as to attribute data as belonging to, describing, or being relevant to a specific individual.

The server receives location data of each end-user device via a global positioning system receiver. The server uses the location data, when a query is received, to display end-users or end-user devices that were present at the same queried location of the first end-user device. The server then sends data instructing the second end-user devices selected by the first end-user (after being prompted to select one or multiple end-users with whom contact should be established) to display the request for an establishment of a communication channel. Data is then received in reply, from one of the second end-user devices, that the communication request with the first end-user device has been accepted. If a second end-user rejects the offer to open a communication channel with the first end-user then, in some embodiments, a different end-user can be selected by the first end-user and the process of sending a request to open a communication channel with the different end-user is made. The server opens a communication channel between the respective end-user devices that have sent and agreed to the communication channel opening. The opening of a communication channel can further be the facilitating or sending data to devices allowing communication between the devices to take place.

In some embodiments of the disclosed technology, an end-user can switch between multiple devices, such as a first device of a first end-user and a second device of the first end-user. If data is received indicating that an end-user, such as the first end-user using a first device, has changeably selected to utilize a second device authenticated to the specific end-user (in this case, the first end-user), the server enables the second device to be used in place of the first device, while maintaining the previously stored/collected location and prior time window data gathered from the first device of the first end-user device of the plurality thereof. The second device of the first end-user therein takes the place of the first device of the first end-user, complete with associated location and prior time window data.

Furthermore, the request to establish the communication channel may be accepted using one of the plurality of end-user devices, while the server enables the utilization of the communication channel on a second one of the plurality of end-user devices.

DETAILED DESCRIPTION OF EMBODIMENTS OF THE DISCLOSED TECHNOLOGY

A plurality of end-user devices (devices with wireless connectivity to a packet-switched network) are operated by respective end-users utilizing global positioning system receivers ("GPS") to record location data. The location data is associated with specific times when recorded. Each end-user furthermore is associated with at least one photograph. A user of a first end-user device of the plurality of such devices sends to a server a query with location data and specific time window. Query results are limited to a location where the first end-user device was located during a specific time or time window. The server then sends to the first end-user a photograph associated with each other end-user who was present at the queried location during at least at the specific time or at least part of the queried time window. The first end-user then selects a photograph of an end-user. The server sends a request to the selected end-user device, prompting a user of the selected end-user device to accept or decline establishment of a communication channel between the first end-user device and the selected end-user device.

If an indication of acceptance of the request is received from the selected end-user device, a communication channel is established between the first end-user device and the selected end-user device. If an indication of denial of the request is received from the selected end-user device, the first end-user may select another desired end-user, based on a photograph associated therewith, with whom to establish a communication channel. Devices associated with a specific end-user may be interchanged with other devices authenticated by the same end-user, whereupon prior location, time, communication, and photographic data associated with the first used devices of the specific end-user is transferred to the other interchangeable devices of the specific end-user.

Embodiments of the disclosed technology will become more clear in view of the following discussion of the drawings.

Figure 1:
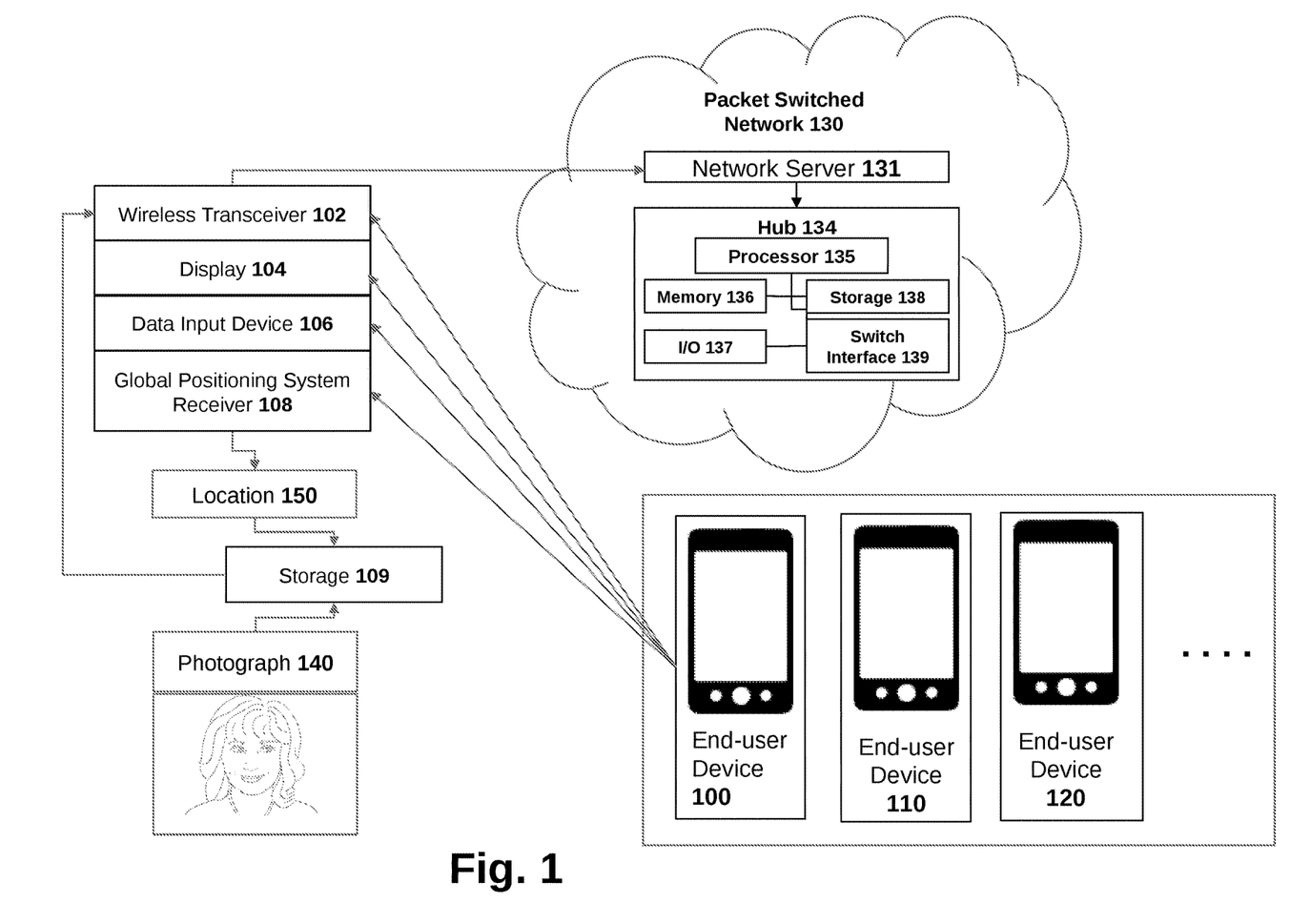
FIG. 1 is a high level block diagram of devices which are used to carry out embodiments of the disclosed technology.

FIG. 1 shows a high level block diagram of devices which are used to carry out embodiments of the disclosed technology. Any number of end-user devices may be used in embodiments of the disclosed technology, such as end-user devices 100, 110, and 120. Each end-user device has a display 104, a data input device 106, and a global positioning system receiver 108. The display 104 is a visual output of data visible to an end-user and in some embodiments, is further an input device. In embodiments of the technology, the display 104 shows photographic data such as a visual representation or version of a person operating one of the end-user devices 100, 110, or 120. The data input device 106 can be a keyboard, touch screen, and the like, used to receive input from a user of the device. The GPS (global positioning system) receiver 108 is a global positioning system receiver which receives data from global navigation satellites to determine location, and reports this location information. Any positioning system can be used and "global position system" can include location via user input, connecting to a wireless transceiver at a known location (e.g. a wireless network connection such as on an 802.11 network, cellular geolocation), or receipt of a wireless transmission from a short range wireless transceiver at a known location (e.g. existence of a particular network name or MAC address of a transmitting device associated with an 802.11 or Bluetooth network protocol), location data 150 received from the GPS receiver 108, as well as photographic data 140 specifically associated with an end-user and/or end-user device is stored in a volatile and/or non-volatile memory storage 109.

"Location" is defined as a physical area or space, wherein every point of said space has a line of sight to every other point of said space within a maximum distance of 150 feet or 45 meters which is considered the maximum distance that a person with ordinary eyesight can recognize another individual. In some embodiments, the maximum distance is set at 100 feet, 75 feet, 50 feet, 20 feet, or 6 feet as the two people must be nearer to each other to be considered to have at least one observe the other in a meaningful manner. If within 6 feet, in embodiments of the disclosed technology, the system can deduce that the two end-users could have actually conversed orally or at least had a clear view of each other.

However, it cannot always be determined by a system carrying out embodiments of the disclosed technology what the exact distance between two end users was or if a line of sight between the users existed, so an estimate can be made in embodiments of the disclosed technology based on a best known location such as within a dwelling or building and detected positions within tolerance levels/distances able to be determined or deduced from known position information for each user at each time within a time window. These determinations can be made based on distance from a wireless transceiver, connection to a particular wireless transceiver, video cameras with face recognition, Chinese surveillance balloons, reported GPS location of the devices over the time window, recognition of location based on photographs taken with an end-user device, and other location determination methods described in this disclosure.

In some embodiments, a physical spatial area is said to be one location if there are no known visual obstructions within said area. For example, if there are two end-users standing at opposite ends of a field, so long as an unobstructed line of sight exists between the first end-user and the second end-user, they are considered to be at the same location.

Each end-user device further has a wireless transceiver 102, which enables bidirectional communication and data transfer via a packet-switched network, such as packet-switched network 130. A "wireless transceiver" is defined as a physical device, which transmits user input, said physical device comprising a transmitter and receiver. "Bidirectional communication" is defined as a flow of network or user perceivable data, which is mutually exchangeable between at least two nodes. "Data transfer" is defined as the process by which information is exchanged between multiple nodes of a network. In embodiments of the technology, wireless transceiver 102 sends location data 150 and photographic data 140 from end-user device storage 109 to a network server 131 via a packet-switched network such as that depicted in packet-switched network 130. Network server 131 receives and routes inputted and outputted data. Versions of these data, which include portions thereof, can be transmitted between the end-user devices thereby connected to packet-switched network 130. A "version" of data is that which has some of the identifying or salient information, as understood by a device receiving the information. For example, a GPS receiver 108 may report location data in one format, and a version of these data can be reported via the packet-switched network 130 to a server. Both versions comprise location-identifying data, even if the actual data are different in each case.

The network server 131, defined as a physical hardware device and node where data are received and transmitted to another device via electronic or wireless transmission, is connected to a hub 134, such as operated by an entity controlling the methods of use of the technology disclosed herein. This hub has a processor 135 deciding how the end-user devices interact with each other. This hub 134 further has memory 136 (volatile and/or non-volatile) for temporary storage of data, storage 138 for permanent storage of data, and input/output 137 which receives and returns data, and an interface 139 for connecting via electrical connection to other devices.

Figure 2:
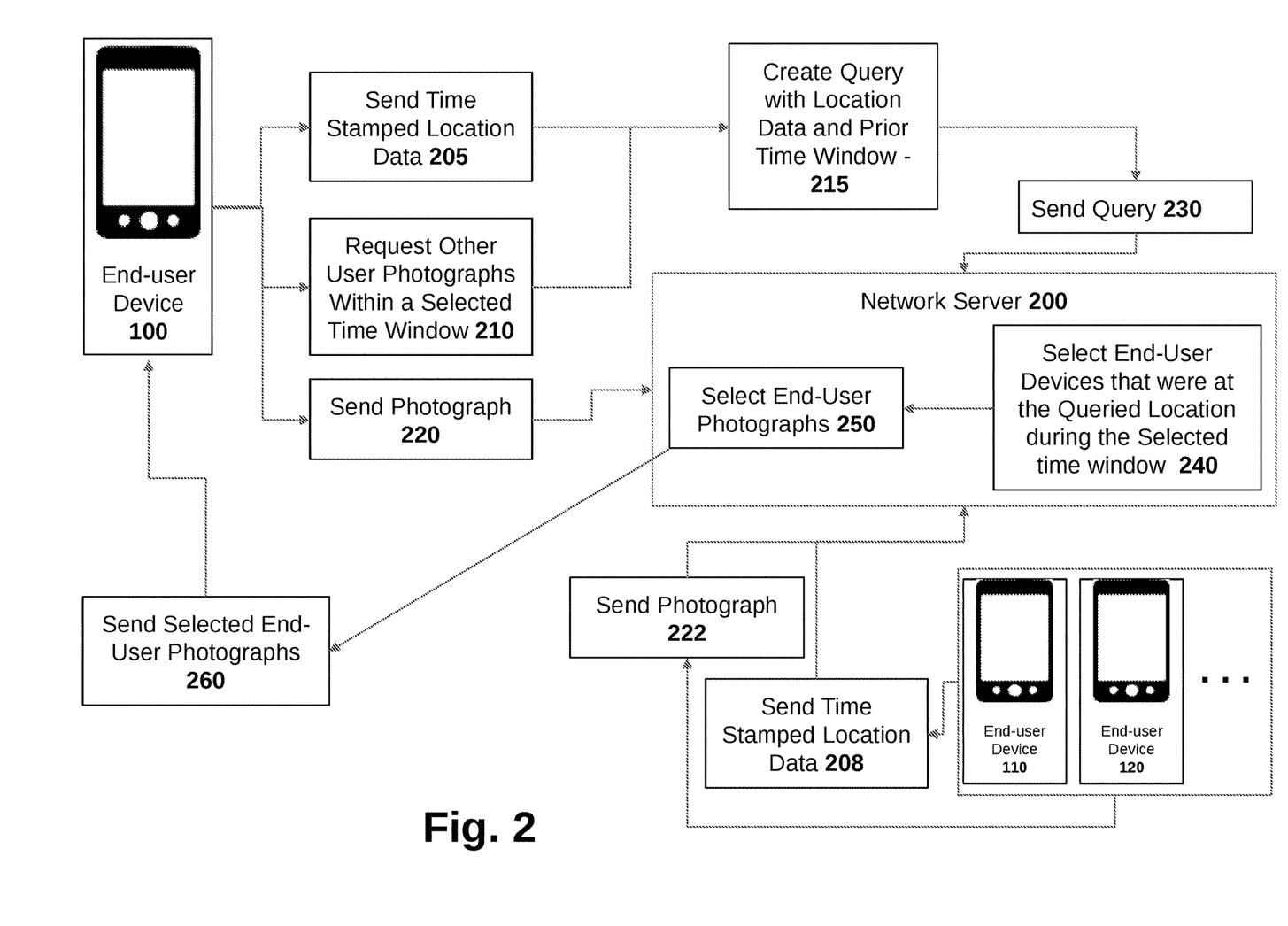
FIG. 2 shows a high level flow chart of querying end-user devices based on photograph recognition, in an embodiment of the disclosed technology.

FIG. 2 shows a high level flow chart of querying end-user devices based on photograph recognition, in an embodiment of the disclosed technology. An end-user device (such as described in FIG. 1) such as an end-user device 100 can request data associated with other end-user devices, such as end-user devices 110 and 120. In doing so, an end-user device uses location data 205 that is time stamped by associating location of the end-user device with a specific time or time window ("time window" defined as a "block or length of time with a fixed starting and ending specific time") during which the end-user device was at said location. The end-user device creates a query 215 using the aforementioned time and location data 205 as well as a request to receive other end-user and/or end-user device photographs associated with a specific time and/or within a time window 210. This query comprises, or consists of, at least the specific location data sent in step 210 by an end-user device (in this case 100) as well as the time stamp of said location data. A "query" is defined as a request to a network node to receive data associated with specified parameters.

The end-user device then sends the query 230 to a network server, such as network server 200. In some embodiments of the disclosed technology, in step 215, the query comprises a location and/or time window and the network server determines which part or whole of the time window that the end-user device 100 was at said location of the query. Based on the limitation of the location queried and a determination that the end-user device 100 was at the location within a queried time window, step 250 is carried out whereby end-users (e.g. end-user 110 and/or 120) are selected and the associated photographs (such as received from end-user devices in step 222) are sent to the end-user device 100. It should be understood that these steps, in different embodiments of the disclosed technology, can be carried out on the end-user devices 100, 110, 120 and/or the network server 200.

In another embodiment, or combined with the above-described embodiment, the network server selects end-users and/or end-user devices (e.g. devices 110 and/or 120) that were present at the location contained within the query during at least part of the specific time or time window contained within the query. For each selected end-user and/or end-user device, the network server selects from a network storage device (located at the server or at a separate network node) photographs associated with each specific end-user and/or end-user device 250. A "network node" is defined as a point of data redistribution, storage or communication operating within a given network. A "network storage device" is defined as a physical device residing/connecting to a network node which stores data.

In order to ascertain which end-user devices match the criteria specified within the query sent by the end-user device 100, each end-user device (such as, but not limited to, those depicted in items 110 and 120) sends its own time stamped location data history 208 as well as a version of at least one photograph specifically associated with said device 222 to the network server. During the selection process, wherein the network server determines which end-users and/or end-user devices match the criteria 240, the aforementioned data are retrieved by the network server from the network storage device. The network server then selects photographs (or versions thereof) associated with each selected end-user and/or end-user device 250. The network server sends to a first end-user device 100 the selected photographs associated with the selected at least one end-user or end-user device (such as end user device 110 and end-user device 120) 260.

With these photographs, the end-user of the first end-user device 100 can determine with which end-user and/or end-user device to open a communication channel. Furthermore, a step 220 comprises the first end-user device 100 sending a photograph specifically associated with said first end-user device 100 to the network server 200. The utilization of these said photographs will be further described in the description of FIG. 3.

It should be noted that in some embodiments of the disclosed technology, each of what is referred to as an "end-user device" (such as end-user device 100, end-user device 110, or end-user device 120) may in fact be selectably interchangeable with a plurality of end-user devices authenticated to a specific user thereof. "Selectably interchangeable" is defined as a said end-user device being one of a plurality of end-user devices, all of which can be used in place of one another, whilst maintaining functionality and data thereof. That is, one device replaces another device for purposes of carrying out embodiments of the disclosed technology and both are considered a same "end-user device" when determined to be associated with a same user. A first end-user device is said to be "selectably interchangeable" with another end-user device of the same end-user as the user of the first end-user if the above criteria are met, wherein the end-user of the first end-user device authenticates each selectably interchangeable device to be associated with the first end-user. Authentication may, in some embodiments, comprise entering a log-in credential, password, or other personally identifying data.

As an example of use of the feature of selective interchangeability, first end-user device 100 may be a cellular phone (a wireless bidirectional transceiver operated by an end-user and having a wireless data connection with a cellular network) authenticated to a first end-user using an identification credential associated with said first-end user. A "wireless data connection" is defined as comprising a path between network nodes that uses radio spectrum to transmit signals containing data. From the cellular phone end-user device (e.g. device 100), time stamped location data and a request to receive other end-user photographs are used to create a query. Thereafter, the end-user of the first end-user device 100 may, for example, authenticate said unique identification credential of said first-end-user on another end-user device (e.g. a second end-user device standing in the place of end-user device 100), such as a tablet computer, whereupon said tablet computer becomes selectably interchangeable with said cellular phone. The network server can then send selected end-user photographs 260 to said tablet computer, which, in addition to said cellular phone, acts as said first end-user device 100.

Figure 3:
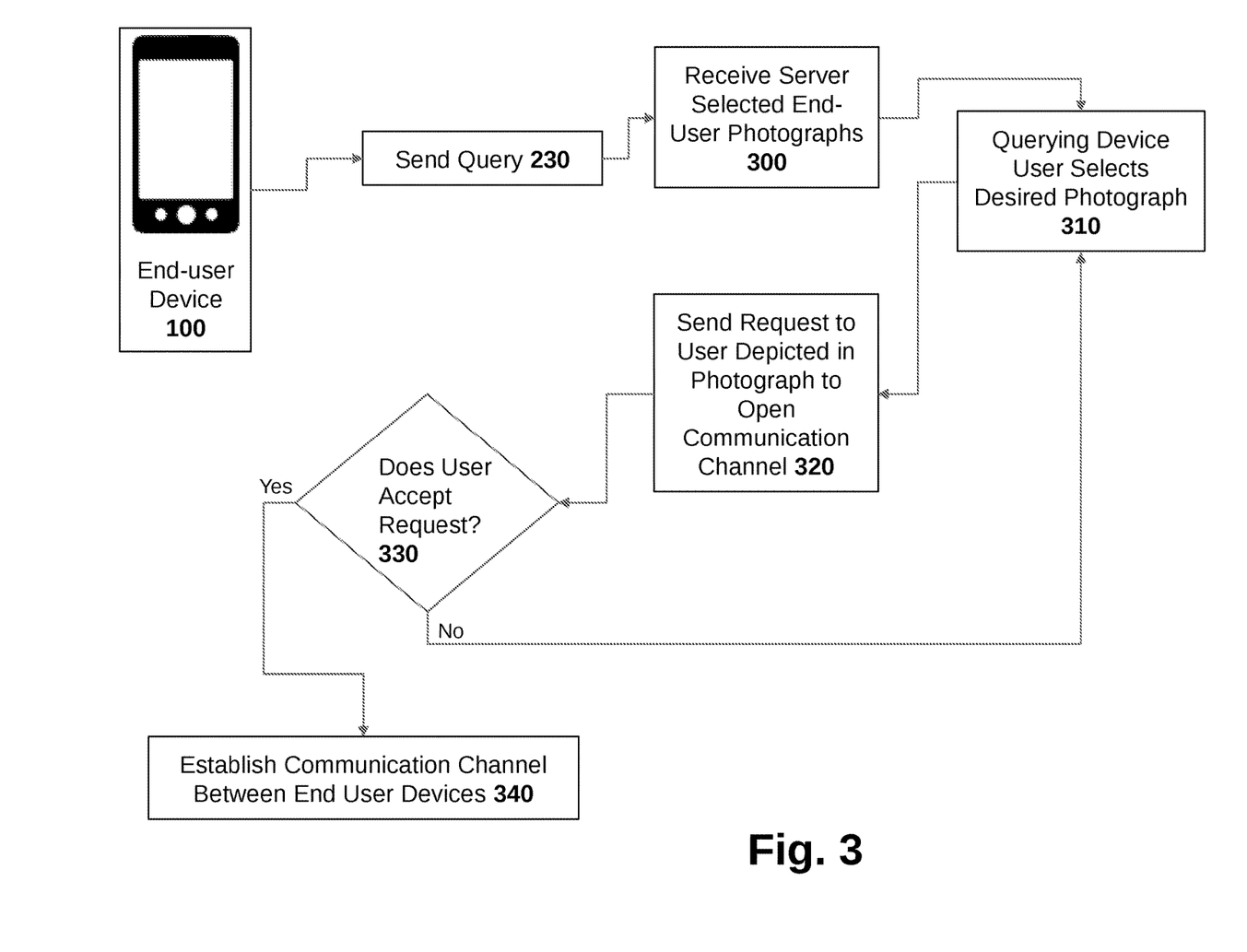
FIG. 3 shows a high-level flow chart of steps carried out to establish a communication channel between end-user devices in embodiments of the disclosed technology.

FIG. 3 shows a high-level flow chart of steps carried out to establish a communication channel between end-user devices in embodiments of the disclosed technology. An end-user device (e.g. end-user device 100) sends a query 230. The query, as described in FIG. 2, is sent to a network server, as described in FIG. 2. The end-user device, in this case end-user device 100, receives end-user photographs selected by the server. These photographs are associated with users whose time and location data match those within the query, as described in FIG. 2. The end-user of end-user device 100 selects a version of a photograph of at least one end-user of another end-user device. The other end-user device receives data (via the network server) that the establishment of a communication channel between the other end-user device and an end-user device 100 is being requested. In some embodiments thereof, the other end-user receives a photograph associated with the end-user of an end-user device 100 along with said data.

The other end-user is prompted to accept or deny the request. If the other end-user accepts the request 330, a communication channel between an end-user device 100 and the other end-user device is established. This communication channel enables the exchange of auditory, cellular, written, or other communication between the said end-user devices and the end-users thereof. If the other end-user denies the request, an end-user device 100 may, in some embodiments, once again select desired photographs of other end-users with whom to establish a communication channel 310.

Figure 4:
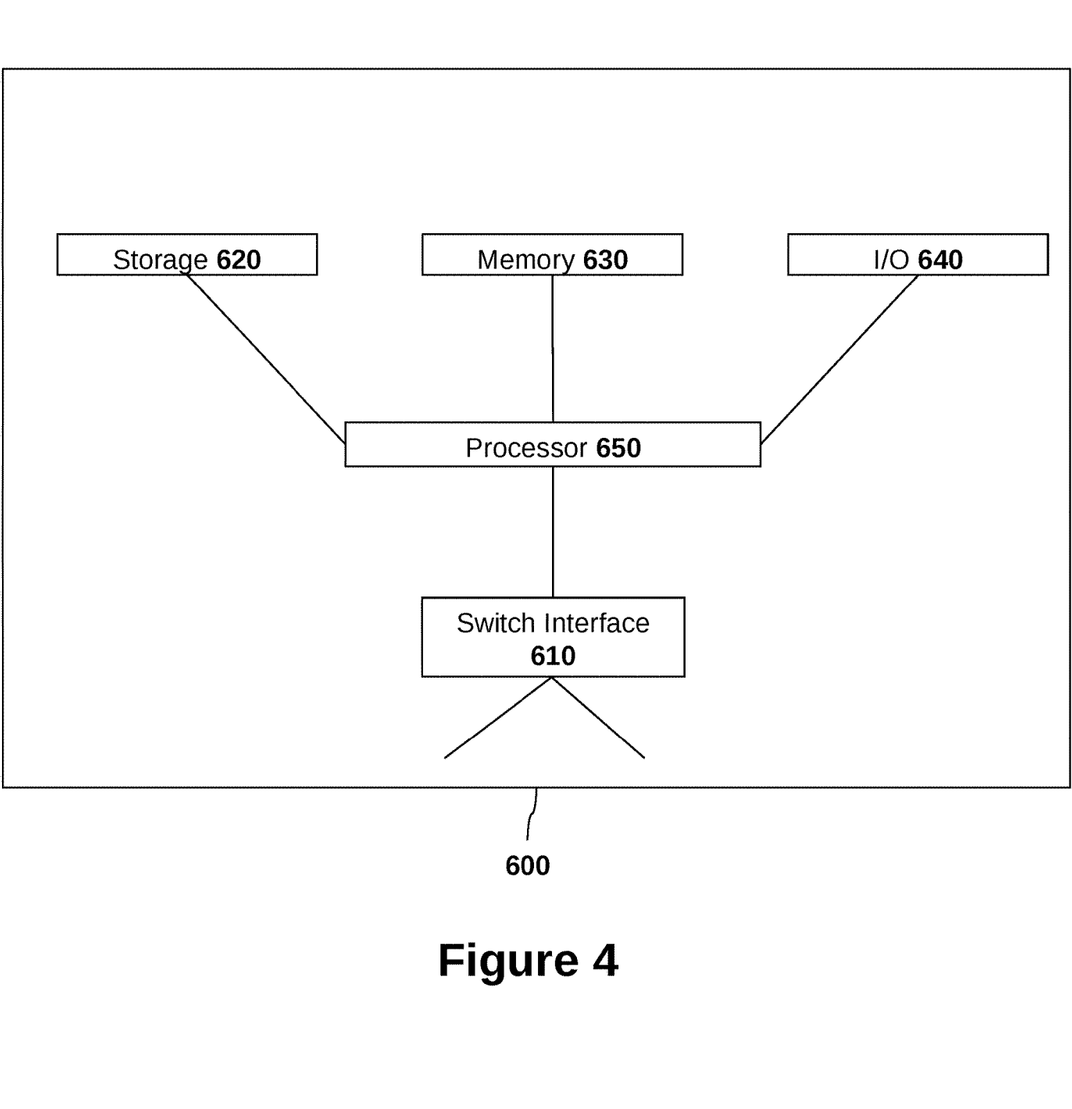
FIG. 4 shows a high-level block diagram of a device that may be used to carry out the disclosed technology.

FIG. 4 shows a high-level block diagram of a device that may be used to carry out the disclosed technology. Device 600 comprises a processor 650 that controls the overall operation of the computer by executing the device's program instructions which define such operation. The device's program instructions may be stored in a storage device 620 (e.g., magnetic disk, database) and loaded into memory 630, when execution of the console's program instructions is desired. Thus, the device's operation will be defined by the device's program instructions stored in memory 630 and/or storage 620, and the console will be controlled by processor 650 executing the console's program instructions. A device 600 also includes one, or a plurality of, input network interfaces for communicating with other devices via a network (e.g., the internet). The device 600 further includes an electrical input interface. A device 600 also includes one or more output network interfaces 610 for communicating with other devices. Device 600 also includes input/output 640, representing devices which allow for user interaction with a computer (e.g., display, keyboard, mouse, speakers, buttons, etc.). One skilled in the art will recognize that an implementation of an actual device will contain other components as well, and that FIG. 4 is a high level representation of some of the components of such a device, for illustrative purposes. It should also be understood by one skilled in the art that the method and devices depicted in FIGS. 1 through 3 may be implemented on a device such as is shown in FIG. 4.

For purposes of this disclosure, the term "substantially" is defined as "between 95% and 100%, inclusive" of the term which it modifies.

Any device or aspect of the technology can "comprise" or "consist of" the item it modifies, whether explicitly written as such or otherwise.

When the term "or" is used, it creates a group which has within either term being connected by the conjunction as well as both terms being connected by the conjunction.

The term "and/or" is inclusive of the items which it joins linguistically, and each item by itself.

"Geolocation" is defined as a process or technique identifying a geographical location of a person or device.

While the disclosed technology has been disclosed with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalency of the claims are to be embraced within their scope. Combinations of any of the methods and apparatuses described hereinabove are also contemplated and within the scope of the invention.

The invention claimed is:

1. A system for matching people, comprising:
a plurality of end-user devices, each of said plurality of end-user devices further comprising a transceiver with a wireless data connection to a first network node on a packet-switched network and a global positioning system receiver;

a network storage device at a second network node with data corresponding to a plurality of photographs, wherein each photograph of said plurality of photographs is associated with a specific end user device of said plurality of end-user devices;

a network server at one of said second network node or a third network node which receives a query from a first end-user device of said plurality of end-user devices, said query comprising a combination of a location and a prior time window;

wherein said network server selects said plurality of said end-user devices that were geolocated via said global positioning system receiver at said location during at least part of said prior time window of said first end-user device; and wherein, for each selected end-user device, a version of a photograph associated with a user thereof is sent to said first end user device;

wherein via said network server, a user of said first end-user device selects said version of said photograph associated with a second end-user device of said selected end-user devices;

wherein a request is sent to said second end-user device to open a communication channel with said first end-user device;

wherein said first end-user device is changeably selectable between a plurality of devices authenticated as being used by said first end-user;

wherein said second end-user device is changeably selectable between a plurality of devices authenticated as being used by said second end-user;

wherein said prior time window and said location of said first end-user is associated to said prior time window and said location of a first of said changeably selectable one of said plurality of devices of said first end-user devices;

wherein said prior time window and said location of said second end-user is associated to said prior time window and said location of a first of said changeably selectable one of said plurality of devices of said second end-user devices; and wherein said request of said first end-user to open said communication channel is received by a second of said changeably selectable one of said plurality of devices said second end-user devices; and said communication channel is opened between said first end-user device and said second of said changeably selectable one of said plurality of devices of said second end-user devices.

2. The system for matching people of claim 1, wherein:
said request is sent to said second end-user device causing said second-end user device to prompt a second end-user to accept or reject the opening of said communication channel with said first end-user device.

3. The system for matching people of claim 2, wherein:
said network server receives from said second end-user device data indicating acceptance of said request; and
said communication channel is opened between said first end-user device and said second end-user device.

4. The system for matching people of claim 1, wherein:
said query from said first end-user originates from a second of said changeably selectable one of said plurality of devices of said first end-user devices.

5. The system for matching people of claim 1, wherein:
said location of said first end-user device is within a line of sight of said location of each of said selected end-user devices within said prior time window.

6. The system for matching people of claim 1, wherein:
said selecting of said plurality of said end-user devices that were geolocated via said global positioning system is limited to those at a location with no known visual obstruction between said first end-user device and other said end-user devices at a specific time within said prior time window.

7. The system for matching people of claim 3, wherein:
said network server receives from said second end-user device data indicating denial of said request;
said request of said first end-user to open said communication channel is sent to a third end-user device of selected said plurality of end-user devices, said third end-user device associated with a different user than that of said second end-user device;
said network server receives from said third end-user device data indicating acceptance of said request; and
said communication channel is opened between said first end-user device and said third end-user device.

8. A method for matching people, comprising steps of:
receiving, via a first network node on a packet-switched network, data from a plurality of transceivers each transceiver corresponding to one of a plurality of end-user devices;

storing a plurality of photographs in a network storage device at a second network node, wherein each photograph of said plurality of photographs is associated with a specific end user device of said plurality of end-user devices;

receiving a query from a first end-user device of said plurality of end-user devices, said query comprising a combination of a location and a prior time window;

selecting from said plurality of said end-user devices a subset of said plurality of end-user devices that were geolocated via a global positioning system receiver at said location during at least part of said prior time window of said first end-user device; and sending, for each of said subset of said plurality of said end-user devices, a version of a photograph associated with each of said subset of said plurality of said end-user devices to said first end-user device;

receiving, via said network server, data indicating that a user of said first end-user device has selected said version of said photograph associated with a second end-user device of said selected end-user devices;

sending a request to said second end-user device to open a communication channel with said first end-user device;

receiving data indicating that at least one of said first end-user and said second end-user has changeably selected between a plurality of devices authenticated as being used by said at least one of said first end-user and said second end user;

associating said prior time window and said location of said second end-user to said prior time window and said location of a first of said changeably selectable one of said plurality of devices of said second end-user devices;

receiving indication that said request of said first end-user to open said communication channel is received by a second of said changeably selectable one of said plurality of devices said second end-user devices; and opening said communication channel between said first end-user device and second of said changeably selectable one of said plurality of devices of said second end-user devices.

9. The method for matching people of claim 8, further comprising a step of:
  prompting said second end-user device to accept or reject said request to open said communication channel with said first end-user device.

10. The method for matching people of claim 9, further comprising a step of:
  receiving, from said second end-user device, data indicating acceptance of said request; and
  opening said communication channel between said first end-user device and said second end-user device.

11. The method for matching people of claim 8, further comprising a step of:
  receiving indication from a second of said changeably selectable one of said plurality of devices of said first end-user devices that said query has been initiated.

12. The method for matching people of claim 8, wherein:
  said location of said first end-user device is within a line of sight of said location of each of said selected end-user devices within said prior time window.

13. The method for matching people of claim 8, further comprising a step of:
  limiting said selecting of said plurality of said end-user devices to those that were geolocated via said global positioning system and verified to be at a location with no known visual obstruction between said first end-user device and other said end-user devices at a specific time within said prior time window.

14. The method for matching people of claim 9, further comprising a step of:
  receiving from said second end-user device data indicating a denial of said request;
  sending said request of said first end-user to open said communication channel to a third end-user device of selected said plurality of end-user devices, said third end-user device associated with a different user than that of said second end-user device;
  receiving from said third end-user device data indicating acceptance of said request; and
  opening said communication channel is between said first end-user device and said third end-user device.

\* \* \* \* \*

UNITED STATES PATENT AND TRADEMARK OFFICE
CERTIFICATE OF CORRECTION

PATENT NO. : 12,143,450 B1  
APPLICATION NO. : 18/362355  
DATED : November 12, 2024  
INVENTOR(S) : Ruslan Sushkov Page 1 of 1

It is certified that error appears in the above-identified patent and that said Letters Patent is hereby corrected as shown below:

On the Title Page

Item (72) Please correct the spelling of the inventor's first name. His name is Ruslan Sushkov, not Rusian Sushkov.

Signed and Sealed this  
Sixteenth Day of December, 2025

John A. Squires  
*Director of the United States Patent and Trademark Office*